UNITED STATES PATENT OFFICE.

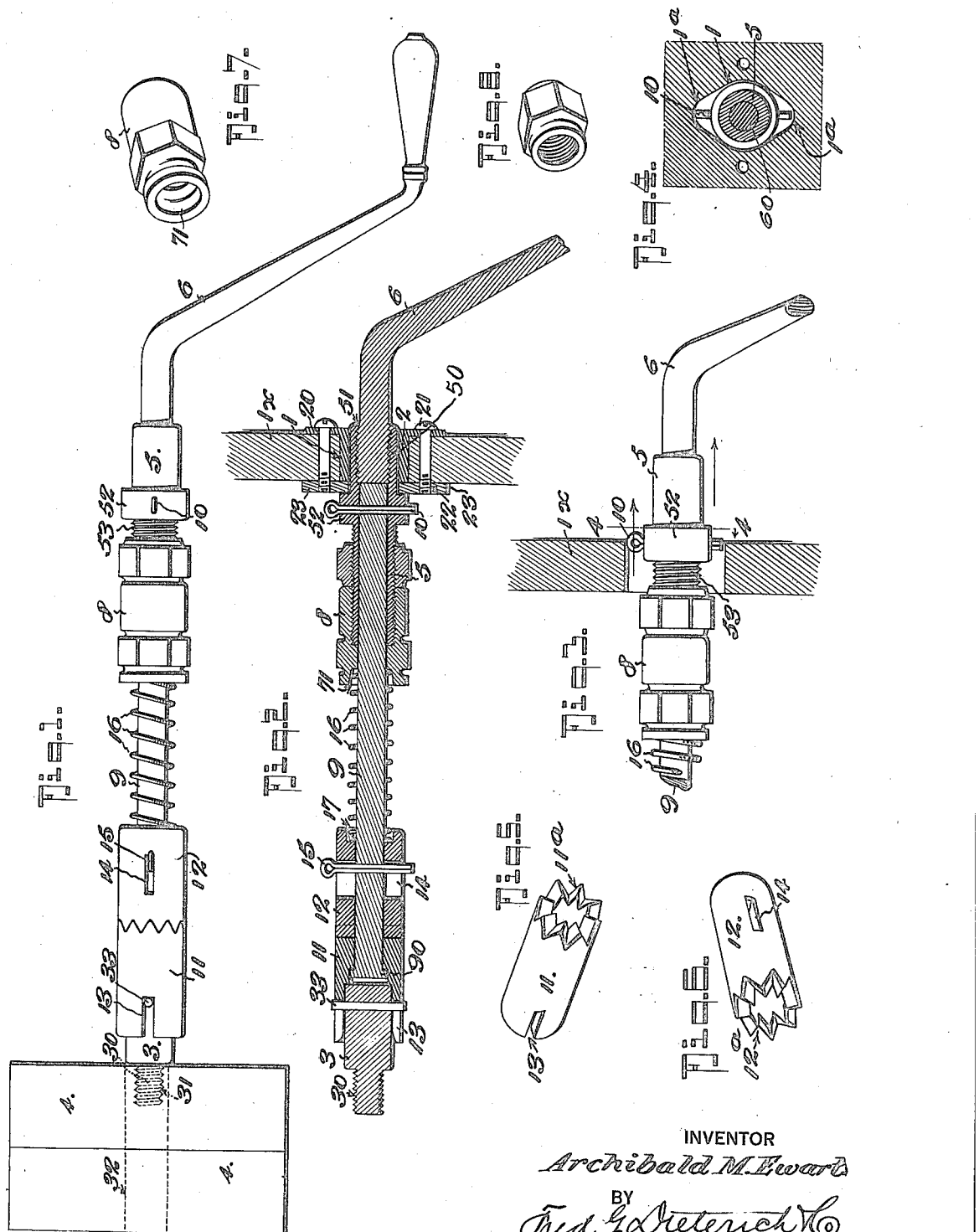

ARCHIBALD M. EWART, OF BARBERTON, OHIO.

MOTOR-WINDING CRANK.

1,232,779.  Specification of Letters Patent.  Patented July 10, 1917.

Application filed March 30, 1917. Serial No. 158,684.

*To all whom it may concern:*

Be it known that I, ARCHIBALD M. EWART, residing at Barberton, in the county of Summit and State of Ohio, have invented a new and Improved Motor-Winding Crank, of which the following is a specification.

My invention has reference to improvements in winding cranks for talking machines and it primarily has for its object to provide an improved construction of crank mechanism of the character stated in which is included a safety device designed for preventing the over winding of the spring and the straining and breaking of the said spring.

My invention also has for its purpose to provide a cranking mechanism of a simple and economical construction, in which the parts are especially designed for being readily applied for use on all classes of talking machines, that can be applied without any material change in the usual way of connecting the winding crank to the motor spring shaft, which can be bodily removed from the motor and the talking machine casing, so that the motor may be elevated for oiling and adjusting, and which effectively serves its intended purpose.

With other objects in view and hereinafter explained, my invention embodies the peculiar construction and combination of the parts set out in the following description, specifically pointed out in the appended claims, and illustrated in the accompanying drawings, in which:

Figure 1 is a plan view of my spring motor winding crank mechanism.

Fig. 2 is a longitudinal section thereof.

Fig. 3 is a plan view of a portion thereof and illustrates the manner it is withdrawn through the casing.

Fig. 4 is a transverse section taken on the line 4—4 and looking in the direction of the arrow.

Fig. 5 is a perspective view of one of the safety clutch members.

Fig. 6 is a similar view of the coöperating clutch member.

Fig. 7 is a detail perspective view of the spring tension adjusting nut, and

Fig. 8 is a similar view of the clamp nut that coöperates therewith.

In the practical application of my invention, I form the aperture 1, in the side wall 1$^x$ of the casing, with oppositely disposed lateral extensions 1$^a$—1$^a$, the reason for which will presently appear, and mount within the said aperture a hub-like bearing 2 formed on an escutcheon plate 20 secured to the side of the casing by machine screws 21 which engage threaded apertures 22 in a plate 23 secured to the inner side of the casing, as shown.

3 indicates a plug formed with an externally threaded end 30 that screws into the threaded socket 31 in the motor spring shaft 32, to which the motor springs 4—4 are secured in the usual way.

5 designates a sleeve that includes a hub portion 50 formed with an internally threaded portion 51 for receiving the threaded end 60 of the crank handle 6, and the said hub portion 50 has a collar 52 for bearing against the inner end of the hub bearing 23 as is clearly shown in Fig. 2, by reference to which it will also be seen sleeve 5 includes a long externally threaded bearing 53, on which is mounted an adjusting nut and a jam nut 8, the outer end of the adjusting nut having a socket 71, as shown.

9 represents a steel shaft, one end of which extends into sleeve 5 and is made fast to the said sleeve by a cotter pin 10 that passes through the hub end of the sleeve and the shaft 9.

11 and 12 are inner and outer clutch members having slip clutch engaging faces 11$^a$—12$^a$.

The outer clutch member 11 has an end socket for slipping onto the plug 3 that is attached to the spring motor shaft and diametrically oppositely elongated slots 13—13 for receiving the ends of a cross pin 33 on the outer end of the plug, as shown.

The inner clutch member 12 has an elongated cross slot 14 for receiving a cotter pin 15 which passes through the steel shaft 9.

16 indicates a coil tension spring mounted on the crank shaft, one end of which seats in the socket 71 of the adjusting nut 7 and the other end seats in a like socket 17 on the inner end of the clutch member 12.

The outer end of shaft 9 has a head portion 90 that prevents the clutch members 11—12 slipping beyond the inner end of the said shaft 9 when adjusting the parts to the operative position.

From the foregoing description taken in connection with the drawing, the complete construction, the manner of operation and the advantages of my invention will be readily understood.

By reason of providing a long bearing sleeve mounted at one end in the side of the casing and providing a plug bearing 3 that forms, as it were, a fixed part of the spring motor shaft, a substantially rigid mounting is provided for the operating parts, which, when the escutcheon with its hub is removed from the casing, may be bodily pulled out through the casing side, by holding the same with the cotter pins in position to aline the lateral extensions of the aperture in the casing end and are as readily shoved back through the said aperture to connect with the plug bar 3.

It is obvious that by coöperatively combining the several parts that constitute the operating mechanism, in the manner shown and described, the entire mechanism can be conveniently disconnected from the motor, when it is desired to elevate the motor for oiling, and can be as readily reapplied when the motor is put back in the operative position.

The tension on the slip clutch members 11—12 can be readily adjusted to suit the desired requirements by proper adjustment of the nut 8.

My construction of crank mechanism is such that it is adapted for use on all classes of talking machines and when the clutch members are assembled in the operative position, they form a part of the winding handle.

The crank handle proper can be removed at any time without removing the other coöperative parts, by simply unscrewing it from the head end of the sleeve.

What I claim is:

1. A spring motor winding crank mechanism that comprises in combination with the motor shaft and a supporting element having an aperture in axial alinement with said motor shaft, a crank shaft, a pair of slip clutch engaging members, one of which turns with the crank shaft, the other of which turns loosely on the said crank shaft, the said latter shaft having means for interlocking with the motor shaft when it is pushed endwise through the aperture in the support, tension means mounted on the crank shaft for holding the clutch members in frictional engagement and means for holding the crank shaft from endwise movement when operatively connected with the motor shaft.

2. A winding crank mechanism for talking machines comprising in combination with the machine casing and the spring motor, said motor including a laterally extended plug attached to the motor spring shaft, the casing having an aperture in axial alinement with the said motor shaft plug; a crank shaft, slip clutch devices mounted on the shaft, a spring tension that engages and holds the clutch devices in frictional engagement, means on the inner end of the crank shaft for interlocking with the motor shaft stud, said crank shaft and its friction clutch devices being bodily endwise movable through the aperture in the machine casing, and means for locking the crank shaft to its operative adjustment, said means comprising an escutcheon plate having a hub that extends into the casing aperture and forms a bearing for the shaft.

3. As a new article, a winding crank mechanism for talking machines comprising a plug adapted for being fixedly attached to one end of the spring motor shaft, a crank actuated shaft, a pair of coöperating friction clutch members on the shaft, one of the said members being keyed to the shaft to turn therewith, the other clutch member and the motor shaft engaging plug having slidably engaged interlocking means, a spring on the shaft for holding the clutch members in operative engagement, a sleeve mounted on the outer end of the crank shaft, said sleeve including a bearing hub for extending into the winding crank shaft receiving aperture of the talking machine casing, means for holding the said crank shaft from endwise movement when applied to its operative position, and adjusting devices on the crank shaft for regulating the tension of the spring.

4. A motor spring winding mechanism for talking machines bodily endwise movable through the usual winding crank shaft aperture in the machine casing, said mechanism including a lug bearing having a threaded end for engaging a threaded socket in the motor shaft, a crank shaft, a sleeve keyed on one end thereof, said sleeve including a hub member that extends beyond the outer end of the crank shaft and is adapted for fitting into the casing aperture, the said hub having a threaded socket for receiving the threaded end of a crank handle, said hub including a stop shoulder, an escutcheon plate for the casing aperture, said plate having a hub that fits the aperture and is engaged by the shoulder on the sleeve hub, the sleeve on the shaft including an externally threaded portion, an adjusting screw nut and a lock screw nut mounted on the threaded end of the sleeve, a pair of interengaging slip clutch members loosely mounted on the outer end of the crank shaft, the inner one of the said clutch members having an elongated cross slot, a key that passes through the said slot and the shaft, a tension spring on the shaft that engages the said inner clutch member and the adjusting screw, the outer clutch member and the shaft plug having interlockable members that engage when the crank winding mechanism is inserted through the casing aperture and is moved into contact with the said shaft plug.

ARCHIBALD M. EWART.